United States Patent
Lee et al.

(10) Patent No.: US 9,601,740 B2
(45) Date of Patent: Mar. 21, 2017

(54) COMPOSITE POROUS SEPARATION MEMBRANE HAVING SHUT-DOWN FUNCTION, METHOD OF MANUFACTURING SAME, AND SECONDARY BATTERIES USING SAME

(71) Applicant: AMOGREENTECH CO., LTD., Gimpo-si (KR)

(72) Inventors: Seung Hoon Lee, Goyang-si (KR); Yong Sik Jung, Namyangju-si (KR); Yun Mi So, Daejeon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 176 days.

(21) Appl. No.: 14/624,846

(22) Filed: Feb. 18, 2015

(65) Prior Publication Data
US 2015/0162588 A1 Jun. 11, 2015

Related U.S. Application Data (62) Division of application No. PCT/KR2013/007442, filed on Aug. 20, 2013.

(30) Foreign Application Priority Data

Aug. 21, 2012 (KR) .................. 10-2012-0091332

(51) Int. Cl.
*H01M 10/05* (2010.01)
*H01M 2/16* (2006.01)
(Continued)

(52) U.S. Cl.
CPC ......... *H01M 2/1686* (2013.01); *H01M 2/145* (2013.01); *H01M 2/162* (2013.01);
(Continued)

(58) Field of Classification Search
None
See application file for complete search history.

(56) References Cited

U.S. PATENT DOCUMENTS

| | | |
|---|---|---|
| 2010/0124701 A1 | 5/2010 | Naoi et al. |
| 2012/0225358 A1 | 9/2012 | Seo et al. |
| 2013/0078527 A1 | 3/2013 | Lee |

FOREIGN PATENT DOCUMENTS

| | | |
|---|---|---|
| JP | 2002216734 | 8/2002 |
| JP | 2008041606 | 2/2008 |

(Continued)

OTHER PUBLICATIONS

International Search Report—PCT/KR2013/007442 dated Dec. 24, 2013.

*Primary Examiner* — Yoshitoshi Takeuchi
(74) *Attorney, Agent, or Firm* — Cantor Colburn LLP (57) ABSTRACT

A composite porous separator includes: a porous substrate acting as a support and having a first melting point and a first porosity; a first porous polymer web layer that is laminated on one side of the porous substrate, and acts as an adhesive layer when being in close contact with an opposing electrode; and a second porous polymer web layer that is laminated on the other surface of the porous substrate, and is formed of nanofibers of a heat-resistant polymer, in which the first porous polymer web layer and the second porous polymer web layer have a melting point higher than the first melting point of the porous substrate and a porosity that is the same as or similar to the first porosity of the porous substrate, respectively.

9 Claims, 3 Drawing Sheets

(51) Int. Cl.
*H01M 10/42* (2006.01)
*H01M 2/14* (2006.01)
*H01M 10/052* (2010.01)

(52) U.S. Cl.
CPC ......... *H01M 2/1606* (2013.01); *H01M 2/166* (2013.01); *H01M 2/1646* (2013.01); *H01M 2/1653* (2013.01); *H01M 10/4235* (2013.01); *H01M 10/052* (2013.01); *H01M 2220/20* (2013.01); *Y02T 10/7011* (2013.01)

(56) References Cited

FOREIGN PATENT DOCUMENTS

| | | |
|---|---|---|
| JP | 2010123381 | 6/2010 |
| KR | 1020040108525 | 12/2004 |
| KR | 1020080013209 | 2/2008 |
| KR | 1020100094363 | 8/2010 |
| KR | 1020110049715 | 5/2011 |
| KR | 1020110089278 | 8/2011 |
| KR | 1020110139133 | 12/2011 |

COMPOSITE POROUS SEPARATION MEMBRANE HAVING SHUT-DOWN FUNCTION, METHOD OF MANUFACTURING SAME, AND SECONDARY BATTERIES USING SAME

CROSS REFERENCE TO RELATED APPLICATIONS

This application is a divisional of International Application No. PCT/KR2013/007442, filed on Aug. 20, 2013, which claims priority to and the benefit of Korean Application No. 10-2012-0091332, filed on Aug. 21, 2012, in the Korean Patent Office, the entire contents of which are incorporated herein by reference.

TECHNICAL FIELD

The present invention relates to a composite porous separation membrane (hereinafter, referred to as a separator) having a shut-down function, a method of manufacturing same, and a secondary battery using same. More particularly, the present invention relates to a composite porous separator having a shut-down function, which can improve ion mobility properties of the separator and has a shut-down function by a porous substrate, a method of manufacturing same, and a secondary battery using same.

BACKGROUND ART

A lithium secondary battery is generally assembled with and includes an anode as a negative electrode, a cathode as a positive electrode, and a separator interposed between the anode and the cathode, in which the separator located between the two electrodes of the lithium secondary battery is a subsidiary material to prevent the anode and the cathode from being in direct contact with each other and from being internally short-circuited, to thus play an important role of improving safety of the secondary battery as well as providing ion channels in the secondary battery.

In the case of a conventional battery manufactured by using a polyolefin-based separator, a phenomenon that the two electrodes and the separator are not adhered closely to each other and are seceded from each other occurs frequently. Accordingly, the lithium ion delivery is not effectively achieved through pores of the separator, and thus the battery performance is lowered.

Further, the conventional separator is made of a chemically stable material that does not cause decomposition and reaction when being exposed to an oxidizing and reducing atmosphere inside the battery, for example, a fluorine-based polymer, in which the mechanical strengths of these substrates are not satisfactory, to thus cause problems such as peeling and breakage of the separator during an assembly process of the battery, and to thereby cause deterioration of safety such as internal short-circuit of the battery. Additionally, to promote heat-resistant performance or high dielectric constant of separators, inorganic particles are coated on the separators. However, the inorganic particles are desorbed due to a low binding capability between the separator and the inorganic particles, to thus fail to realize a desired effect.

Meanwhile, when a large-capacity secondary battery with high energy density should have a relatively high operating temperature range, and continue to be used at a high rate charge-discharge state, the temperature of the battery rises up. Therefore, separators that are used for these batteries require higher heat resistance and heat stability than those required in typical separators. In addition, the large-capacity secondary battery with high energy density should possess battery characteristics such as high ion conductivity so as to respond to rapid charge-discharge and low temperature.

The separator is placed between the anode and the cathode of a battery to perform an isolation function. The separator maintains an electrolytic solution to thus provide an ionic conduction pathway. The separator has a shutdown function of blocking the pores by melting part of the separator to block electric current if the battery temperature rises up too much.

When the separator is melted as the temperature gets higher, a big hole is created to thus cause a short circuit to occur between the anode and the cathode. The temperature is called a short-circuit temperature. Generally, the separator should have a lower shutdown temperature and a higher short-circuit temperature.

Therefore, it is very important for the secondary battery to have both a shutdown function and a heat-resistance performance in order to achieve a high-energy density and large-area secondary battery. In other words, it is required that the separator should have an excellent heat-resistance performance to thus cause small thermal shrinkage and an excellent cycling performance due to a high ionic conductivity.

It is very deficient to use an existing lithium-ion secondary battery using a polyolefin separator and a liquid electrolyte or an existing lithium-ion polymer battery using a polymer electrolyte that is obtained by coating a gel polymer on a gel polymer electrolyte or a polyolefin separator, for a high-energy density and large-capacity secondary battery in terms of the heat-resistance. Therefore, the heat-resistance performance that is required for a high-capacity and large-area secondary battery for automobiles does not meet the safety requirements.

Korean Patent Application Publication No. 2008-13209 discloses a separator having a heat-resistance and ultra-fine fibrous layer as the separator that is formed by coating a fibrous layer on one surface or both surfaces of a porous film, in which the fibrous layer includes: a fibrous material that is formed by electrospinning a heat-resistance polymer material whose melting point is not less than 180° C. or having no melting point; and a fibrous material that is formed by electrospinning a swellable polymer material on an electrolytic solution.

In the Korean Patent Application Publication No. 2008-13209, since a conventional polyolefin-based porous film used as a separator is used as a central substrate, the fibrous layer laminated on the polyolefin-based porous film having a low porosity may have a limitation that any layer of a multilayer structure cannot have excellent properties of a porous web obtained by an electrospinning method, particularly, ion conductivity due to a high porosity.

In addition, Korean Patent Application Publication No. 2004-108525 discloses a composite film for an electrochemical device in which the composite film uniformly absorbs an electrolyte solution, to thus greatly improve performance of a battery, and in which the composite film has an excellent mechanical strength and a satisfactory binding force with electrodes, to thus increase a battery manufacturing process speed.

In the Korean Patent Application Publication No. 2004-108525, the composite film has a structure that a porous film of a polymer web form is laminated on one surface and/or both surfaces of a polyolefin-based microporous film used as a strength support, in which the polyolefin-based microporous film has an average pore size of 0.005~3 μm, a porosity of 30~80%, a tensile strength of 700 kg/cm² or more in a mechanical direction thereof, a transverse tensile strength of 150 kg/cm² or more, and a thickness of 5~50 μm.

In particular, in an embodiment of the Korean Patent Application Publication No. 2004-108525, a composite film having an entire porosity of 58% is obtained when web-shaped porous films of a porosity of 55% and a porosity of 80% of a polyolefin-based microporous PP (polypropylene) film are laminated to obtain a three-layer structure, and a composite film having an entire porosity of 45% is obtained when a web-shaped porous film is formed on a polyolefin-based microporous PE (polyethylene) film of a porosity of 43% by an electrospinning method to thus laminate a three-layer structure.

Thus, the composite film of the Korean Patent Application Publication No. 2004-108525 has porosity depending on that of the polyolefin-based porous film since the porosity of the polyolefin-based porous film is greatly lower than that of the web-shaped porous film, resulting in falling of ionic mobility characteristics. That is, the composite film does not use properties of the web-shaped porous film having a high porosity at maximum.

SUMMARY OF THE INVENTION

To solve the above problems or defects of the conventional art, it is an object of the present invention to provide a composite porous separator and a secondary battery using the same, in which a porosity of a porous substrate used as a support is set in the same as or similarly to that of a porous polymer web layer laminated on the porous substrate, to thus prevent the porosity of the composite porous separator from being dependent on the porous substrate, and in which properties of the porous polymer web layer having a high porosity are used at maximum, to thus improve ionic mobility characteristics of the composite porous separator.

It is another object of the present invention to provide a composite porous separator and a secondary battery using the same, in which a first porous polymer web layer acting as an adhesive layer and a heat-resistant second porous polymer web layer that is formed of a mixture of a heat-resistant polymer and inorganic particles are provided on both sides or one side of a porous substrate that is used as a strength support, or the first porous polymer web layer and the second porous polymer web layer are laminated to form a laminate, to thus implement a shutdown function by the porous substrate whose melting point is lower than those of the first and second porous polymer web layers.

It is still another object of the present invention to provide a method of manufacturing a composite porous separator of a three layer structure having a shutdown function by using a porous substrate that is used as a strength support and is available at low cost.

To accomplish the above and other objects of the present invention, according to an aspect of the present invention, there is provided a composite porous separator having a shutdown function, the composite porous separator comprising: a porous substrate acting as a support and having a first melting point and a first porosity; a first porous polymer web layer that is laminated on one side of the porous substrate, and acts as an adhesive layer when being in close contact with an opposing electrode; and a second porous polymer web layer that is laminated on the other surface of the porous substrate, and is formed of nanofibers of a heat-resistant polymer, wherein the first porous polymer web layer and the second porous polymer web layer have a melting point higher than the first melting point of the porous substrate and a porosity that is the same as or similar to the first porosity of the porous substrate, respectively.

According to another aspect of the present invention, there is provided a composite porous separator having a shutdown function, the composite porous separator comprising: a porous substrate acting as a support and having a first melting point and a first porosity; a second porous polymer web layer that is laminated on one surface of the porous substrate, and is formed of nanofibers of a heat-resistant polymer; a first porous polymer web layer that is laminated on top of the second porous polymer web layer, and acts as an adhesive layer when being in close contact with an opposing electrode, wherein the first porous polymer web layer and the second porous polymer web layer have a melting point higher than the first melting point of the porous substrate and a porosity that is the same as or similar to the first porosity of the porous substrate, respectively.

According to still another aspect of the present invention, there is provided a composite porous separator having a shutdown function, the composite porous separator comprising: a porous substrate acting as a support and having a first melting point and a first porosity; a non-pore polymer film layer that is laminated on one side of the porous substrate, acts as an adhesive layer when being in close contact with an opposing electrode, and is formed in order to lower the porosity of the porous substrate; and a porous polymer web layer that is laminated on the other surface of the porous substrate, and is formed of nanofibers of a heat-resistant polymer, wherein the porous polymer web layer has a melting point higher than the first melting point of the porous substrate and a porosity that is the same as or similar to the first porosity of the porous substrate, respectively.

According to yet another aspect of the present invention, there is provided a composite porous separator having a shutdown function, the composite porous separator comprising: a porous substrate acting as a support and having a first melting point and a first porosity; and first and second porous polymer web layers that are laminated on both sides of the porous substrate, respectively, and are formed of nanofibers of a heat-resistant polymer, wherein the first porous polymer web layer and the second porous polymer web layer have a melting point higher than the first melting point of the porous substrate and a porosity that is the same as or similar to the first porosity of the porous substrate, respectively.

According to still yet another aspect of the present invention, there is provided a method of manufacturing a composite porous separator having a shutdown function, the method comprising the steps of: forming a first porous polymer web layer that acts as an adhesive layer, by electrospinning a polymer that is swellable in an electrolytic solution and enables electrolytic ions to conduct on one surface of a porous substrate acting as a support and having a first melting point and a first porosity; and forming a second porous polymer web layer that is formed of nanofibers, by electrospinning a heat-resistant polymer with inorganic particles, or a mixture of a heat-resistant polymer and a swellable polymer with the inorganic particles, on the other surface of the porous substrate.

According to a further aspect of the present invention, there is provided a method of manufacturing a composite porous separator having a shutdown function, the method comprising the steps of: forming a first porous polymer web layer that acts as an adhesive layer, by electrospinning a polymer that is swellable in an electrolytic solution and enables electrolytic ions to conduct; forming a second porous polymer web layer that is formed of nanofibers, by electrospinning a heat-resistant polymer with inorganic particles, or a mixture of a heat-resistant polymer and a swellable polymer with the inorganic particles; and laminating and calendaring the first porous polymer web layer and the second porous polymer web layer on both sides or one side of a porous substrate acting as a support and having a first melting point and a first porosity.

According to a still further aspect of the present invention, there is provided a method of manufacturing a composite porous separator having a shutdown function, the method comprising the steps of: dissolving a heat-resistant polymer with inorganic particles, or a mixture of a heat-resistant polymer and a swellable polymer with the inorganic particles, in solvent to prepare a first spinning solution; dissolving a polymer that is swellable in an electrolytic solution and enables electrolytic ions to conduct in a solvent to prepare a second spinning solution; and sequentially electrospinning the first spinning solution and the second spinning solution on one surface of a porous substrate acting as a support and having a first melting point and a first porosity, to thus form first and second porous polymer web layers that are stacked in two layers.

According to a yet further aspect of the present invention, there is provided a secondary battery comprising: a cathode; an anode; a separator separating the cathode and the anode; and an electrolyte solution, wherein the separator is made of a three-layer structure by laminating a first porous polymer web layer that acts as an adhesive layer and a second porous polymer web layer that is formed of nanofibers of a heat-resistant polymer when being in close contact with an opposing electrode, on both sides of a porous substrate acting as a support and having a first melting point and a first porosity, or by laminating the first porous polymer web layer and the second porous polymer web layer on one side of the porous substrate, and wherein the first porous polymer web layer and the second porous polymer web layer have a melting point higher than the first melting point of the porous substrate and a porosity that is the same as or similar to the first porosity of the porous substrate, respectively.

In the case that the porous substrate is formed of a nonwoven fabric made of a double structure fiber in which polyethylene (PE) is coated on the outer periphery of polypropylene (PP) fibers, or a polyethylene terephthalate (PET) nonwoven fabric made of PET fibers, heat treatment of the first porous polymer web layer is performed in order to lower the porosity of the porous substrate, to thus be deformed into a non-pore polymer film layer.

As described above, according to the present invention, a composite porous separator and a secondary battery using the same, are configured to set a porosity of a porous substrate used as a support in the same as or similarly to that of a porous polymer web layer laminated on the porous substrate, to thus prevent the porosity of the composite porous separator from being dependent on the porous substrate, and are configured to utilize properties of the porous polymer web layer having a high porosity at maximum, to thus improve ionic mobility characteristics of the composite porous separator.

In addition, according to the present invention, a composite porous separator and a secondary battery using the same, are configured to include a first porous polymer web layer acting as an adhesive layer and a heat-resistant second porous polymer web layer on both sides or one side of a porous substrate that is used as a support, respectively, or laminate the first and second porous polymer web layers on one side of the porous substrate, to thus enhance the adhesion between the separator and the electrode, prevent escape or peeling of the separator that can occur during an assembly process, enhance the heat resistance of the separator, improve safety of a secondary battery and prevent degradation of performance of the secondary battery.

Further, according to the present invention, a composite porous separator and a secondary battery using the same are configured to include a porous substrate having a melting point relatively lower than those of first and second porous polymer web layers, to thus realize a shutdown function and secure safety of the secondary battery.

Further, according to the present invention, a composite porous separator and a secondary battery using the same, are configured to use a porous substrate that is used as a strength support and is available at low cost, to thus realize a multi-layer structure separator having an excellent tensile strength and a shutdown function.

DETAILED DESCRIPTION OF THE INVENTION

Hereinafter, a heat-resistant and high strength ultra-fine fiber-shaped porous separator having a shutdown function will be described in more detail with reference to the accompanying drawings in accordance with the present invention.

Figure 1:
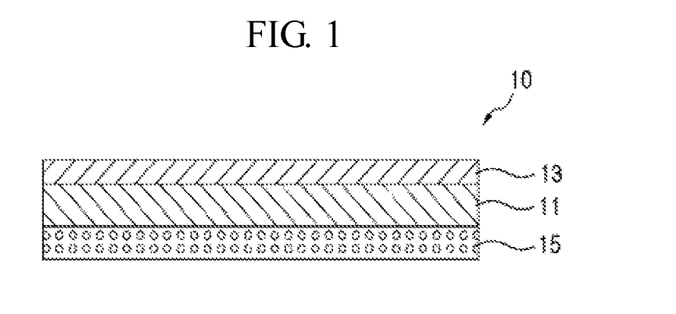
FIG. 1 is a cross-sectional view of a composite porous separator having a shutdown function according to a first embodiment of the present invention.
Figure 2:
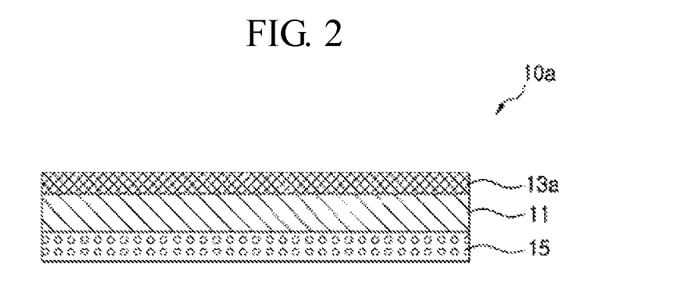
FIG. 2 is a cross-sectional view of a composite porous separator having a shutdown function according to a second embodiment of the present invention.

FIG. 1 is a cross-sectional view of a composite porous separator having a shutdown function according to a first embodiment of the present invention, and FIG. 2 is a cross-sectional view of a composite porous separator having a shutdown function according to a second embodiment of the present invention.

(Structure of a Separator)

First, as shown in FIG. 1, a composite porous separator 10 according to a first embodiment of the present invention has a shutdown function, and includes a first porous polymer web layer 13 acting as an adhesive layer and a second porous polymer web layer 15 containing an electrolytic solution as a heat-resistant support on both sides of a porous substrate 11 used as a support, respectively.

The porous substrate 11 is set to have a melting point relatively lower than the first porous polymer web layer 13 and the heat-resistant second porous polymer web layer 15 laminated on both sides of the porous substrate 11, to thereby make the separator have a shutdown function when the temperature rise is achieved.

For this purpose, the porous substrate 11 may employ a porous membrane made of polyethylene (PE) whose melting point is about 120° C., or a nonwoven fabric made of a PP/PE or PET fiber, in consideration of safety of a secondary battery in which boiling of an electrolytic solution occurs at about 150° C.

First, the polyethylene (PE) porous membrane used as the porous substrate 11 is prepared in a dry process, by using a porosity as high as 60~80%, which will be set higher than the porosity of a polyolefin-based porous film (or membrane) of a typical two-layer or three-layer structure that is commercially available as a separator. The PE porous membrane has a high porosity that cannot be used as a separator in case of a single film, and also has the strength that is lowered.

Further, the PE porous membrane is set to have a higher porosity than a polyolefin-based porous membrane of a commercially available two-layer or three-layer structure, e.g., a PP/PE or PP/PE/PP membrane or a PE membrane of a single-layer structure, to thereby lower a mechanical tensile strength and a transverse tensile strength. As a result, the PE porous membrane that is used as the PE porous separator 11 has, for example, a mechanical tensile strength of 700 $kg/cm^2$ or less, and a transverse tensile strength of 150 $kg/cm^2$ or less.

From this viewpoint, the PE porous membrane is required to be set to the minimum thickness, to thus preferably use a thickness of 5~9 μm. If is less than 5 μm, the air-permeability is lowered, and if the thickness exceeds 9 μm, a proportion of the thickness occupied by the polyethylene (PE) porous membrane is increased at a state where the total thickness of the separator is limited, to thereby cause the thickness of the porous polymer web layer 15 formed on the outer periphery of the PE porous membrane to get thin, and to thus fail to prevent the overall shrinkage of the separator.

Further, a nonwoven fabric that can be used as the porous substrate 11 may employ a nonwoven fabric made of PP/PE fibers of a double structure fiber in which polyethylene (PE) is coated on the outer periphery of polypropylene (PP) fibers, as a core, or a polyethylene terephthalate (PET) nonwoven fabric made of PET fibers.

In the case that the porous substrate 11 is made of the PE porous membrane, the first porous polymer web layer 13 that is laminated on one side of the porous substrate 11 acts as an adhesive layer so as to be easily adhered to the anode when being inserted and assembled between the anode and cathode as shown in FIG. 1. For this purpose, the first porous polymer web layer 13 may employ a porous polymer web that is obtained by electrospinning a polymer having an excellent adhesiveness with a negative electrode active material, e.g., PVDF (polyvinylidene fluoride).

Further, in the case that the porous substrate 11 is made of a nonwoven fabric formed of PP/PE or PET fibers, the nonwoven fabric has too large pores and thus the first porous polymer web layer 13 is transformed into a non-pore polymer film layer 13*a* to preferably use the thin-film non-pore polymer film layer 13*a* in place of the first porous polymer web layer 13 to lower the porosity of the porous substrate 11 on one side of the porous substrate 11, like the separator 10*a* of the second embodiment shown in FIG. 2.

The first porous polymer web layer 13 and the non-pore polymer film layer 13*a* are swelled in the electrolyte solution, and may be made of any one of a polymer capable of conducting the electrolytic ions, for example, PVDF (polyvinylidene fluoride), PEO (polyethylene oxide), PMMA (polymethyl methacrylate), TPU (thermoplastic polyurethane). In this case, the PVDF is the most preferable polymer having a swelling property in the electrolyte solution, enabling the electrolytic ions to be conductive, and having an excellent adhesiveness to the anode active material.

Figure 5:
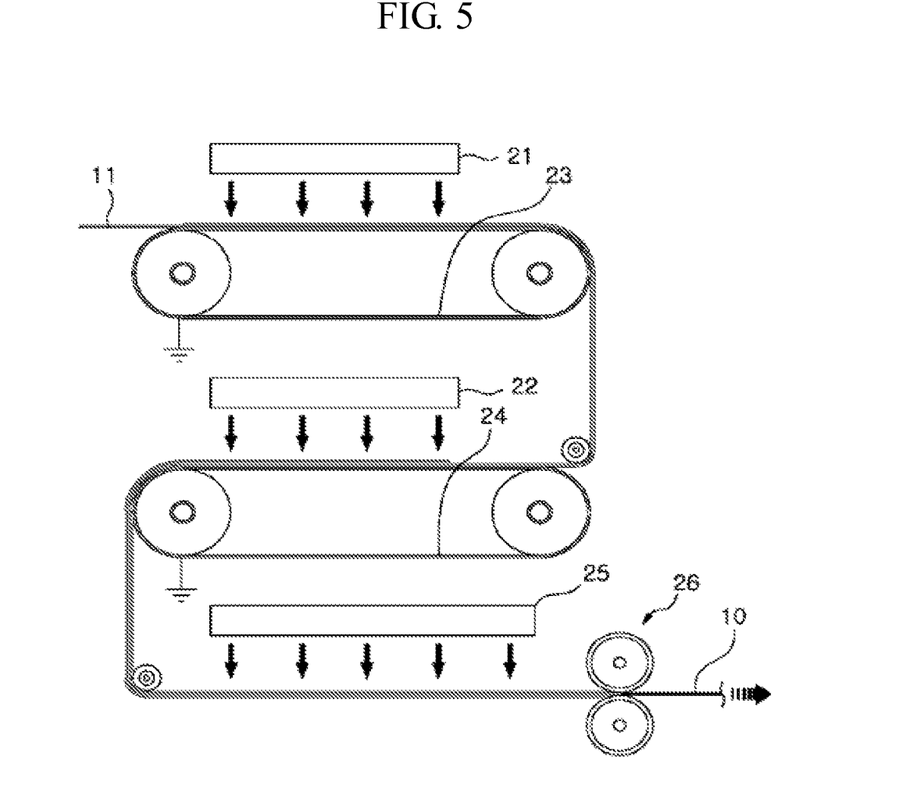
FIG. 5 is a diagram showing a process of manufacturing the composite porous separator in a top-down manner according to the first embodiment of the present invention.

In addition, the first porous polymer web layer 13 is formed of an ultra-fine fibrous porous polymer web, which is configured by the following processes of: for example, dissolving a polymer that is swellable in an electrolytic solution and enables electrolytic ions to conduct in a solvent to thus form a first spinning solution; and electrospinning the first spinning solution by using a first multi-hole nozzle pack 21 with an air-electrospinning (AES) method, on one side of the porous substrate 11 as shown in FIG. 5.

The non-pore polymer film layer 13*a* may be formed by the following processes of: forming the first porous polymer web layer 13 on one side of the porous substrate 11; and performing a heat treatment of a surface of the first porous polymer web layer 13 by using a heater 25 at a lower temperature than a melting point of the polymer e.g., PVDF, to thereby transform the first porous polymer web layer 13 into the non-pore polymer film layer 13*a*. The diameters of the fibers forming the porous polymer web range between 0.3~1.5 μm. The first porous polymer web layer 13 that is used to form the non-pore polymer film layer 13*a* is preferably formed of a thin film having a thickness of 2~3 μm.

The reason why the heat treatment temperature is somewhat lower than the melting point of the polymer in the heat treatment step is that the residual solvents exist in the polymer web.

The non-pore polymer film layer 13*a* that is applied to the second embodiment is swelled in the electrolytic solution when the non-pore polymer film layer 13*a* is impregnated in the electrolytic solution, to thus enable lithium ions to conduct. Further, the non-pore polymer film layer 13*a* is made to be ultra-thin, and thus does not act as resistance, to thereby increase mobility of lithium ions.

When the non-pore polymer film layer 13*a* is compressed to be in close contact with a surface of the anode active material layer as described above at the later time of assembling the electrodes, the non-pore polymer film layer 13*a* is swelled in the electrolytic solution and thus lithium ions can conduct but a space between the anode and the separator is prevented from being formed, to thus prevent lithium ions from being collected and deposited into a lithium metal. As a result, formation of dendrite on the surface of the anode can be suppressed to thus improve reliability.

The heat-resistant second porous polymer web layer 15 laminated on the other surface of the porous substrate 11 is inserted between the anode and the cathode, is preferably in opposite contact with the cathode during an assembly process, and is impregnated with the electrolytic solution, to thereby play a major role of a separator. Since the heat-resistant second porous polymer web layer 15 is made of a porous web having a three-dimensional porous structure, the electrolytic solution absorption speed is very high, and the porosity is preferably set to 50~80%. If the porosity is less than 50%, the ion mobility characteristic is deteriorated, and if the porosity exceeds 80%, the micro short-circuit may occur.

The average diameter of the fibers forming the second porous polymer web layer 15 makes a very great influence upon the porosity and pore size distribution. The smaller the fiber diameter, the smaller the pore size, and the smaller the pore size distribution. Further, the smaller the fiber diameter, the larger a specific surface area of the fiber, and the larger the ability of maintaining the electrolytic solution, to thereby reduce possibility of leakage of the electrolytic solution. In the present invention, it is preferable that a fiber diameter constituting the second porous polymer web layer 15 is in a range of 0.3~1.5 µm, and the second porous polymer web layer 15 has a thickness of 4~14 µm.

The second porous polymer web layer 15 is formed of a porous web, which is configured by the following processes of: for example, dissolving a heat-resistant polymer with inorganic particles, or a mixture of a heat-resistant polymer and a swellable polymer with the inorganic particles, in a solvent to thus form a second spinning solution; and electrospinning the second spinning solution by using a second multi-hole nozzle pack 22 with an air-electrospinning (AES) method, on the other side of the porous substrate 11 as shown in FIG. 5, to thereby perform spinning of ultra-fine fibers, and produce fibers as well as the porous web that is fused and laminated in a three-dimensional network structure. The porous web made of ultra-thin fibers is ultra-thin and ultra-light and has a high ratio of the surface area compared to the volume and a high porosity.

The ultra-fine fibrous porous polymer web is produced from the second spinning solution and the obtained porous polymer web is calendered at a temperature equal to or below the melting point of the polymer in a calender device 26, to thus form the heat-resistant second porous polymer web layer 15.

The inorganic particles contained in the second spinning solution may include at least one selected from the group consisting of $Al_2O_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, and $Sn_2BPO_6$, and a mixture thereof.

In the case of a heat-resistant polymer with inorganic particles, or a mixture of a heat-resistant polymer and a swellable polymer with the inorganic particles, it is preferable that a content of the inorganic particles is in a range of 10 to 25 wt % for the whole mixture, when a size of the inorganic particles is between 10~100 nm. More preferably, a content of the inorganic particles is in a range of 10~20 wt % for the whole mixture, and a size of the inorganic particles is between 15~25 nm.

In the case that a content of the inorganic particles is less than 10 wt % for the whole mixture, a film shape is not maintained, contraction occurs, and a desired heat-resistant property is not obtained. In the case that a content of the inorganic particles exceeds 25 wt % for the whole mixture, a spinning trouble phenomenon that contaminates a spinning nozzle tip provided in the second multi-hole nozzle pack 22 occurs, and the solvent quickly evaporates, to thus lower strength of the film.

In addition, in the case that a size of the inorganic particles is less than 10 nm, a volume is too large bulky and thus it is cumbersome to handle the mixture. In the case that a size of the inorganic particles exceeds 100 nm, a phenomenon of lumping the inorganic particles occurs and thus a lot of the inorganic particles are exposed out of the fibers, to thereby cause the strength of the fibers to drop. In addition, it is preferable that the inorganic particles have sizes smaller than diameters of fibers so as to be included in nanofibers. In the case that a small quantity of the inorganic particles having larger sizes than diameters of fibers are mixed and used, ionic conductivity may be improved unless the strength and spinning performance of fibers are interfered.

In addition, in the case of the mixture of the heat-resistant polymer, the swellable polymer, and the inorganic particles, it is preferable that the heat-resistant polymer and the swellable polymer are mixed at a weight ratio in a range of 5:5 to 7:3. More preferably, the heat-resistant polymer and the swellable polymer are mixed at a weight ratio of 6:4. In this case, the swellable polymer is added as a binder role that helps bonding between the fibers.

In the case that a mixing ratio of the heat-resistant polymer and the swellable polymer is smaller than 5:5 at a weight ratio, a heat-resistant property drops and a required high temperature property is not obtained. In the case that a mixing ratio of the heat-resistant polymer and the swellable polymer is larger than 7:3 at a weight ratio, strengths of the fibers fall down and a spinning trouble occurs.

The heat-resistant polymer resin that may be used in the present invention is a resin that can be dissolved in an organic solvent for electrospinning and whose melting point is 180□ or higher, for example, any one selected from the group consisting of: aromatic polyester containing at least one of polyacrylonitrile PAN, polyamide, polyimide, polyamide-imide, poly meta-phenylene iso-phthalamide, polysulfone, polyether ketone, polyethylene terephthalate, polytrimethylene terephthalate, and polyethylene naphthalate; polyphosphazenes containing at least one of polytetrafluoroethylene, polydiphenoxy phosphazene, and poly {bis [2-2-methoxyethoxy phosphazene]}; polyurethane copolymer containing at least one of polyurethane and polyether urethane; cellulose acetate, cellulose acetate butylrate, and cellulose acetate propionate.

The swellable polymer material that may be used in the present invention is a resin that is swollen in an electrolyte, and may be formed into an ultrafine fiber by an electrospinning method, for example, any one selected from the group consisting of: polyvinylidene fluoride PVDF, poly vinylidene fluoride-co-hexafluoropropylene, perfluoropolymer, polyvinyl chloride or polyvinylidene chloride, and copolymer thereof; polyethylene glycol derivatives containing at least one of polyethylene glycol dialkylether and polyethylene glycol dialkyl ester; polyoxide containing at least one of poly oxymethylene-oligo-oxyethylene, polyethylene oxide and polypropylene oxide; polyacrylonitrile copolymer containing at least one of polyvinyl acetate, poly vinyl pyrrolidone-vinyl acetate, polystyrene, polystyrene acrylonitrile copolymer, and polyacrylonitrile methyl methacrylate copolymer; and polymethyl methacrylate, and polymethyl methacrylate copolymer, and any one combination thereof.

In the case that the second porous polymer web layer 15 does not contain inorganic materials, a mixed polymer that is formed by mixing the heat-resistant polymer and the swellable polymer is preferably used as the second porous polymer web layer 15. In the case that the second porous polymer web layer 15 contains inorganic materials, the heat-resistant polymer, the swellable polymer, or a mixed polymer that is formed by mixing the heat-resistant polymer and the swellable polymer can be used as the second porous polymer web layer 15.

Figure 3:
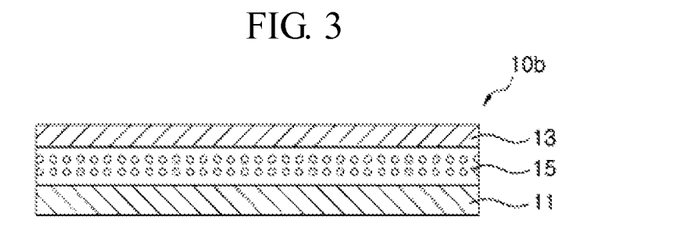
FIG. 3 is a cross-sectional view of a composite porous separator having a shutdown function according to a third embodiment of the present invention.

In the first embodiment of the present invention, the structure that the first porous polymer web layer 13 and the mineral-containing second porous polymer web layer 15 are formed on both sides of the porous substrate 11, respectively, has been illustrated; however, it is possible to change the first embodiment into the third embodiment shown in FIG. 3.

That is, the composite porous separator 10b according to the third embodiment of the present invention is configured by sequentially laminating the mineral-containing second porous polymer web layer 15 and the first porous polymer web layer 13 on any one side of the porous substrate 11 in the case that the porous substrate 11 is made of a PE porous membrane.

The laminated structure of the second porous polymer web layer 15 containing inorganic materials and the first porous polymer web layer 13 is configured by the following processes of: preparing a multi-hole nozzle pack in which a plurality of first spinning nozzles and a plurality of second spinning nozzles are disposed along the traveling direction of a collector; spinning a second spinning solution from the second spinning nozzles on the upper surface of the porous substrate 11, to thus form the mineral-containing second porous polymer web layer 15; spinning a first spinning solution from the first spinning nozzles on the upper surface of the second porous polymer web layer 15, to thus sequentially form the first porous polymer web layer 13 formed of a porous polymer web; and calendering the obtained porous polymer web of a two-layer structure at a temperature below a melting point of the polymer, to thereby obtain the laminated structure of a desired thickness.

Figure 4:
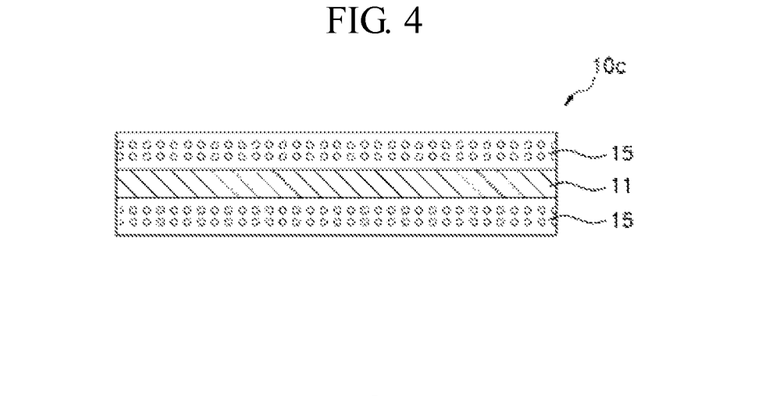
FIG. 4 is a cross-sectional view of a composite porous separator having a shutdown function according to a fourth embodiment of the present invention.

FIG. 4 shows a composite porous separator 10c having a shutdown function according to a fourth embodiment of the present invention.

The composite porous separator 10c illustrated in FIG. 4 according to the fourth embodiment is reinforced with heat resistance, and is configured by using a nonwoven fabric consisting of a PP/PE or PET fiber as a porous substrate 11, and laminating mineral-containing second porous polymer web layers 15 and 15 on both sides of the porous substrate 11, respectively.

In the case of using the porous substrate 11 consisting of the nonwoven fabric as in the fourth embodiment, the pores are so large and thus it is preferable to laminate thick-film mineral-containing second porous polymer web layers 15 and 15 on both sides of the porous substrate 11, respectively, in order to lower the porosity of the composite porous separator 10c.

In the case of the composite porous separators 10-10c according to the first to fourth embodiments, the mineral-containing second porous polymer web layer 15 is preferably set in the range of 4~14 μm thick, and the first porous polymer web layer 13 is preferably set in the range of 2~3 μm thick.

A conventional film type PE separator may shrink at high temperatures, but the second porous polymer web layer 15 according to the present invention contains the mineral. Accordingly, even when the composite porous separators 10-10c are heat-treated at 500° C., the shape is maintained without shrinkage or melting.

Accordingly, in the case of the separator according to the present invention, although lithium ions move rapidly through pinholes and thus the instantaneous temperature rises up to 400~500° C., the separator that is a web made of nanofibers suppresses the thermal diffusion phenomenon, and has the excellent thermal stability due to the inorganic material contained in the heat-resistant polymer and nanofibers.

A secondary battery according to the present invention includes an electrolytic solution in an electrode assembly having a separator between an anode and a cathode.

The electrolytic solution according to the present invention includes a non-aqueous organic solvent, and the non-aqueous organic solvent may include carbonate, ester, ether, or ketone. The carbonate may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester may include butyrolactone (BL), decanolide, valerolactone, mevalonolactone, caprolactone, n-methyl acetate, n-ethyl acetate, n-propyl acetate, and the like. The ether may include dibutyl ether, etc. The ketone may include poly methyl vinyl ketone. However, the present invention is not limited to the non-aqueous organic solvent.

In addition, the electrolytic solution according to the present invention includes a lithium salt, and the lithium salt acts as a source of lithium ions within a cell and enables a basic operation of a lithium battery. The examples of the lithium salt may be at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (here, x and y are natural numbers, respectively) and $LiSO_3CF_3$, or a mixture thereof.

As described above, an electrode assembly is assembled and then the electrode assembly is contained in aluminum or an aluminum alloy can or a similar container, to then close an opening portion with a cap assembly and inject an electrolytic solution in the electrode assembly and to thereby manufacture a lithium secondary battery.

The composite porous separators 10-10c each having a shutdown function according to the present invention are configured to make the porous substrate 11 have a relatively lower melting point than the first porous polymer web layer 13 and the heat-resistant second porous polymer web layer 15.

The porous separators 10-10c each having a three-layer structure may be configured into and used as secondary batteries. If the external short circuit occurs in the secondary batteries, the excessive current is made to flow inside the secondary batteries. As a result, heat is generated in the secondary batteries.

In this case, pores are generated in the separator, in which a relatively rapid ionic motion is locally caused in the pores, in comparison with the other parts of the separator. Thus, local heat generation occurs part of the pores. If the temperature of the corresponding part of the pores rises up to the range of 100~120° C., due to such local heat generation, the porous substrate 11 is melted to thus shut down corresponding pores in which the porous substrate 11 has a relatively low melting point of 120° C. in comparison with the first porous polymer web layer 13 and the heat-resistant second porous polymer web layer 15.

Further, even in the case that an entire secondary battery including a separator reaches the set temperature due to the influence of the surrounding environment, the porous substrate 11 is melted and shut down, in which the porous substrate 11 has a relatively low melting point in comparison with the first porous polymer web layer 13 (for example, PVDF has a melting point of 170~185° C.) and the heat-resistant second porous polymer web layer 15 (e.g., PAN has a melting point of 220° C.).

Furthermore, even when the temperature rises up and the porous substrate 11 is contracted, the heat-resistant second porous polymer web layer 15 that is located at the other side of the porous substrate 11 is prevented from being deformed, thereby maintaining the shapes of the separators 10-10c, and to thus promote the stability of the secondary batteries containing the separators.

Furthermore, when the porous substrate 11 is made of a porous nonwoven fabric, and the PVDF non-pore polymer film layer 13a is formed on one side of the porous substrate 11, the non-pore polymer film layer 13a with excellent adhesion is in close contact with and assembled on the surface of the anode, to thereby play a role of suppressing formation of dendrite.

(Manufacturing of a Separator)

Hereinafter, a method of manufacturing a composite porous separator according to the present invention will be described below with reference to FIGS. 5 and 6.

The composite porous separator 10 according to a first embodiment of the present invention is manufactured by the following processes. In the case that a top-down injection mode is performed as illustrated in FIG. 5, a polymer is dissolved in a solvent to thus prepare a first spinning solution, in which the polymer is swellable in an electrolytic solution, and electrolytic ions is able to conduct.

Thereafter, when the porous substrate 11 is transferred along a first collector 23 below a first multi-hole nozzle pack 21, and is made of a PE porous membrane that has been prepared in a dry process, the first spinning solution is electrospun on one side of the porous substrate 11, with an air-electrospinning (AES) method, by using the first multi-hole nozzle pack 21, to thus form an ultra-fine fibrous first porous polymer web 13.

The air-electrospinning (AES) method according to the present invention is a spinning method, in which a high voltage electrostatic force of 90~120 Kv is applied between the spinning nozzles of the first multi-hole nozzle pack 21 from which a polymer solution is spun and the collector 23, and thus ultra-fine fibers are spun on the collector 23, to thus form the first porous polymer web 13, in which case air is sprayed for each spinning nozzle to thus prevent the spun fibers from flying without being collected on the collector 23.

Subsequently, a heat-resistant polymer with inorganic particles, or a mixture of a heat-resistant polymer and a swellable polymer with the inorganic particles, is dissolved in a solvent to thus prepare a second spinning solution. Then, the second spinning solution is electrospun on the other side of the porous substrate 11 that is transferred along a second collector 24, with the air-electrospinning (AES) method, by using a second multi-hole nozzle pack 22, to thus achieve spinning of ultra-fine fibers, and to thus produce fibers and concurrently form a second porous polymer web 15 that is fused and laminated in a three-dimensional network structure.

Meanwhile, in the case that the composite porous separator 10a according to the second embodiment is manufactured by using a porous nonwoven fabric made of PP/PE or PET fibers, as the porous substrate 11, as shown in FIG. 5, the first porous polymer web 13 is laminated on one side of the porous substrate 11, and the second porous polymer web 15 is laminated on the other side of the porous substrate 11. On the following, if the first porous polymer web 13 is transferred at a state where the first porous polymer web 13 is exposed to a heater 25, the first porous polymer web 13 is transformed into the non-pore polymer film layer 13a.

Subsequently, the three-layer laminate undergoes calendaring in a calendar unit 26, and thus the thickness of the laminate is adjusted.

In the manufacturing process of the composite porous separator according to the first embodiment illustrated in FIG. 5, the first and second spinning solutions are electrospun in a top-down manner from the first multi-hole nozzle pack 21 and the second multi-hole nozzle pack 22, respectively, to thereby form the first porous polymer web 13 and the second porous polymer web 15 on both sides of the porous substrate 11.

Figure 6:
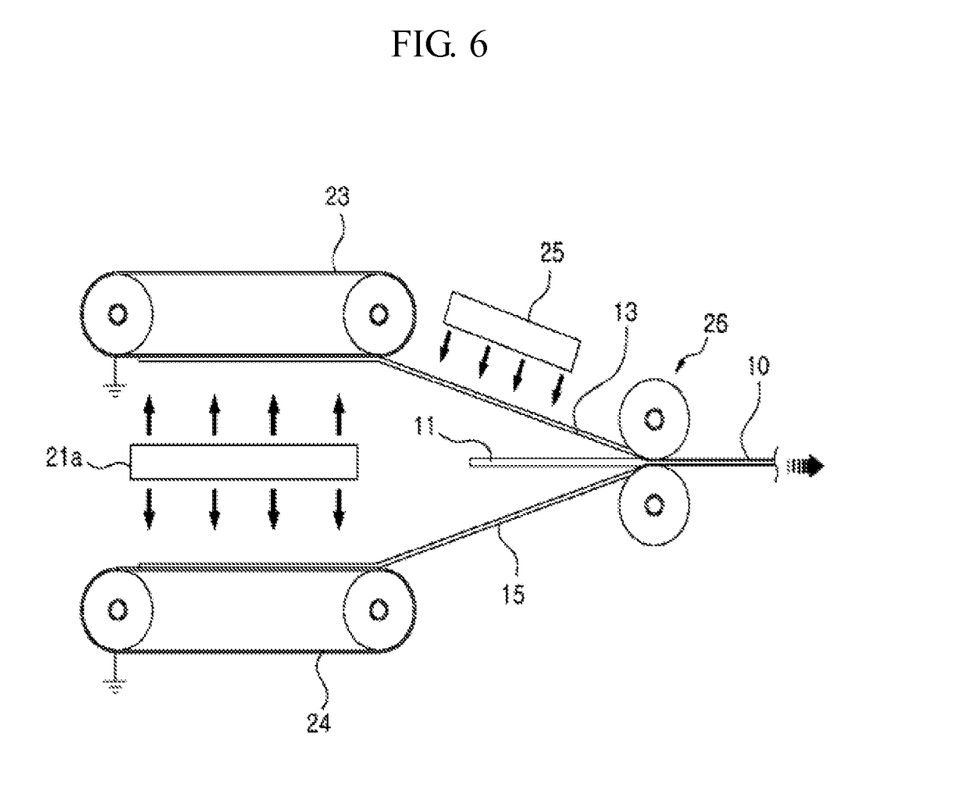
FIG. 6 is a diagram showing a process of manufacturing the composite porous separator in a combination of a top-down manner and a bottom-up manner according to the first embodiment of the present invention.

However, a method of manufacturing a composite porous separator can be performed as shown in FIG. 6, according to the present invention. Here, first and second spinning solutions are electrospun on first and second collectors 23 and 24 in a bottom-up manner and a top-down manner from a multi-hole nozzle pack 21a, respectively, to thereby form the first porous polymer web 13 and the second porous polymer web 15, respectively. Then, the first and second porous polymer webs 13 and 15 that are obtained at a state where the solvent remains are laminated on both sides of the porous substrate 11, and then undergo calendaring in the calendar unit 26, to accordingly form a three-layer structure composite porous separator 10.

Further, in the case of using a porous nonwoven fabric made of PP/PE or PET fibers, as the porous substrate 11, as shown in FIG. 6, it is preferable to execute a process of transforming the first porous polymer web layer 13 into a non-pore polymer film layer 13a by a heat treatment before the first porous polymer web layer 13 is laminated on the porous substrate 11.

Here, the spinning method that is applied for a method of manufacturing a composite porous separator according to the present invention can employ any one selected from general electrospinning, air-electrospinning (AES), electro-spray, electrobrown spinning, centrifugal electrospinning, and flash-electrospinning.

The spinning nozzles of the multi-hole nozzle pack used in the present invention are configured to set an air pressure of an air jet to be in a range of 0.1~0.6 MPa when using an air electrospinning (AES) method. In this case, the air pressure that is less than 0.1 MPa is not contributed to collection/integration, and the air pressure that exceeds 0.6 MPa hardens the cones of the spinning nozzles to thus clog the needle and to thereby cause the spinning trouble to occur.

When preparing a spinning solution by using a mixed polymer of a heat-resistant polymer material and a swellable polymer material in the present invention, a single solvent or a two-component mixed solvent that is formed by mixing a high boiling point solvent and a low boiling point solvent can be employed. In this case, a mixing ratio of the two-component mixed solvent and the entire polymer material is preferably set to a weight ratio of about 8:2.

Considering that the solvent volatilization may not be well achieved depending on the type of the polymer when using a single solvent in the present invention, the present invention can be designed to pass through a pre-air dry zone by a pre-heater after a spinning process, and undergo a process of adjusting the amount of the solvent and moisture remaining on the surface of the porous web.

In the pre-air dry zone by the pre-heater, air of 20~40° C. is applied to a porous web by using a fan, and thus the amount of the solvent and moisture remaining on the surface of the porous web is adjusted, to thereby prevent the porous web from being bulky and to thus play a role of enhancing the strength of the separator and simultaneously adjust porosity of the separator.

In this case, in the case that calendaring is performed at a state the solvent volatilization is too much caused, the porosity is increased but the strength of the web is weak. Reversely, when the solvent volatilization is little caused, a phenomenon of melting the web occurs.

As described above, when the heat-resistant composite porous separator 10 according to the present invention generates heat or reaches a shutdown temperature in terms of the whole separator due to locally rapid ion movement, since the porous substrate 11 is calendered in a multi-layer structure together with the first porous polymer web layer 13 and the heat-resistant second porous polymer web layer 15, part of or all of the porous substrate 11 having a lower melting point in comparison with the first porous polymer web layer 13 and the heat-resistant second porous polymer web layer 15 is melted and shut down.

Meanwhile, since the separator of a single-layer or multilayer structure made of the porous polymer web has a low tensile strength, the porous substrate made of a PE porous membrane or nonwoven fabric having a relatively high tensile strength is used as a support to thus increase the tensile strength of the separator.

Further, when the composite porous separator 10 according to the invention uses a PE porous membrane prepared by using a dry process for example, as the porous substrate 11 used as the support, the porosity of the porous substrate 11 is set to be the same as or similar to the porosities of the first porous polymer web layer 13 and the heat-resistant second porous polymer web layer 15, to thereby prevent the porosity of the composite porous separator 10 from being dependent on the porous substrate 11, and the properties of the web-shaped porous separator having the high porosity are utilized at maximum to thereby significantly improve the ion mobility and C-rate characteristics of the composite porous separator.

In the embodiments described above, the composite porous separators 10-10c have been exemplified with respect to the cases the first porous polymer web layer 13 and the heat-resistant second porous polymer web layer 15 are laminated on both sides or one side of the porous substrate 11 to thus form a three-layer structure, but the first porous polymer web layer 13 that serves as an adhesive layer may be omitted if necessary, to thereby form a two-layer structure in which the porous substrate 11 and the heat-resistant second porous polymer web layer 15 are laminated on each other.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention can be applied to heat-resistant and high-strength composite separators having a shutdown function by forming a porous membrane in a multi-layer structure, in lithium-ion secondary batteries, lithium-ion polymer batteries, secondary batteries that contain supercapacitors, requiring high heat-resistance and thermal stability such as hybrid electric vehicles, electric vehicles and fuel cell vehicles, and their preparation thereof.

What is claimed is:

1. A composite porous separator having a shutdown function, the composite porous separator comprising:
    (1) a porous substrate acting as a support and having a first melting point and a first porosity;
    (2) a first porous polymer web layer that is formed on one side of the porous substrate, and acts as an adhesive layer when in close contact with an opposing electrode; and
    (3) a second porous polymer web layer that is formed on the other surface of the porous substrate, and is formed of nanofibers of a heat-resistant polymer,
    wherein the first porous polymer web layer and the second porous polymer web layer have a melting point higher than the first melting point of the porous substrate and a porosity that is the same as or similar to the first porosity of the porous substrate, respectively,
    wherein the porous substrate has a thickness set in the range of 5-9 μm, the first porous polymer web layer has a thickness set in the range of 2-3 μm, and the second porous polymer web layer has a thickness set in the range of 4-14 μm.

2. The composite porous separator having a shutdown function according to claim 1, wherein the porosity of the porous substrate is set to 60 to 80%, the porosities of the first porous polymer web layer and the second porous polymer web layer are respectively set to 50~80%.

3. The composite porous separator having a shutdown function according to claim 1, wherein the porous substrate is a polyethylene (PE) porous membrane.

4. The composite porous separator having a shutdown function according to claim 3, wherein the porous substrate is set to have a mechanical tensile strength of 700 kg/cm$^2$ or less, and a transverse tensile strength of 150 kg/cm$^2$ or less.

5. The composite porous separator having a shutdown function according to claim 1, wherein the first porous polymer web layer is made of a polymer that is swellable in an electrolytic solution and enables electrolytic ions to conduct.

6. The composite porous separator having a shutdown function according to claim 1, wherein the nanofibers of the second porous polymer web layer further comprise a swellable polymer and inorganic particles.

7. The composite porous separator having a shutdown function according to claim 6, wherein contents of the inorganic particles are in the range from 10~25% by weight on the whole content of the nanofibers, and size of the inorganic particles is in the range of 10~100 nm.

8. The composite porous separator having a shutdown function according to claim 6, wherein the heat-resistant polymer and the swellable polymer are mixed at a weight ratio ranging from 5:5 to 7:3.

9. A secondary battery comprising:
    a cathode;
    an anode;
    a separator separating the cathode and the anode; and
    an electrolyte solution,
    wherein the separator is made of a composite porous separator having a shutdown function according to claim 1.

* * * * *